United States Patent [19]
Mehta et al.

[11] Patent Number: 5,678,180
[45] Date of Patent: Oct. 14, 1997

[54] COMMUNICATION SYSTEM AND METHOD PROVIDING DISPATCH AND CELLULAR INTERCONNECT COMMUNICATIONS

[75] Inventors: Ashok Mehta; Lin-nan Lee, both of Potomac, Md.; Jim Hobza, Carlsbad, Calif.; Stanley Kay, Rockville, Md.

[73] Assignee: Hughes Electronics, Los Angeles, Calif.

[21] Appl. No.: 480,727

[22] Filed: Jun. 7, 1995

[51] Int. Cl.⁶ .................. H04Q 7/00; H04Q 9/00
[52] U.S. Cl. ............ 455/33.1; 455/54.1; 455/56.1; 455/34.1
[58] Field of Search .............. 455/33.1, 33.2, 455/34.1, 56.1, 58.1, 54.1, 53.1, 54.2, 57.1, 15, 16, 17; 370/466, 401

[56] References Cited

U.S. PATENT DOCUMENTS

| | | | |
|---|---|---|---|
| 5,313,654 | 5/1994 | Comroe et al. | 455/33.1 |
| 5,319,796 | 6/1994 | Grube et al. | 455/33.4 |
| 5,371,898 | 12/1994 | Grube et al. | 455/33.1 |
| 5,408,466 | 4/1995 | Ablay | 370/24 |
| 5,416,770 | 5/1995 | Stoner et al. | 370/60 |
| 5,548,806 | 8/1996 | Yamaguchi et al. | 455/33.1 |

*Primary Examiner*—Reinhard J. Eisenzopf
*Assistant Examiner*—Darnell R. Armstrong
*Attorney, Agent, or Firm*—John Whelan; Wanda Denson-Low

[57] ABSTRACT

A dispatch system and a cellular interconnect system are combined to form a single system in which dispatch and interconnect communications are made with use of common system equipment. Different system configurations are employed according to the number of cells in the system to minimize loss of cellular interconnect capacity arising from dispatch communication operations.

14 Claims, 8 Drawing Sheets

SMALL/SMALL

COMMUNICATION SYSTEM AND METHOD PROVIDING DISPATCH AND CELLULAR INTERCONNECT COMMUNICATIONS

BACKGROUND OF THE INVENTION

The present invention relates to communication systems and more particularly to cellular systems in which both dispatch communications and interconnect communications are provided.

Conventional dispatch communication systems usually employ a high power tower at an elevated location relative to the entire area being served by the tower. The service area might have a radius such as forty miles and frequencies might not be reused within seventy miles. Mobile units in the service area, such as those in a taxi fleet or a bus fleet, transmit to the tower and receive broadcasts from the tower.

The dispatch system typically supports multiparticipant conversations. In the current art, a multiparticipant conversation is executed by a single remote transmitter sending a signal to the large tower in one direction of a duplex frequency pair. The large tower retransmits that signal to all of the participants independently of their locations within the coverage area on the other half of the duplex radio channel pair.

At the present time, dispatch communication systems are provided throughout the United States, and most of these are generally structured in the manner just described with communications provided in the SMR band typically with analog apparatus. Dispatch areas are independent of each other, i.e., if a mobile unit departs from the service area, tower communications are lost since no provision is made for handoff to any adjacent area.

In cellular communication systems, each geographic area is subdivided into multiple subareas serviced by respective base stations comprising respective small, relatively low power, communication towers. Interconnect traffic is generally point-to-point involving one radio channel in the cell in which a mobile unit is located.

Cellular base stations enable reuse of authorized frequencies. As is well known, frequency reuse combined with large numbers of cells can advantageously increase the number of interconnect subscribers supported in a geographical area and thus provide greater system communication capacity.

A cellular system, having general alignment with a dispatch system, could have multiple small cells in a dispatch communication area.

Recently, the Federal Communications Commission (FCC) authorized use of the SMR band for cellular-like communications. The authorized expansion of cellular communications into the dispatch band is called enhanced SMR (ESMR) since dispatch communications can be made to be more like cellular communications.

A basic problem that arises when dispatch and interconnect communications are combined, through at least common use of station towers, is that the participants in a single dispatch conversation may be located in a multiplicity of the small cells of the dispatch area. One half of a duplex pair is needed in each of the cells for each dispatch conversation. If subscribers are located in F cells, then the interconnect capacity of the dispatch cellular system is reduced by a minimum factor of 1/F. If the system has no information regarding the exact cells in which dispatch customers are located, the capacity is reduced by the total number of cells in the system which may be a much larger reduction than 1/F.

Interconnect and dispatch communications have been combined in at least one prior art communication system since the authorization of ESMR by the FCC. So far as is known, prior art systems, in which interconnect and dispatch communications have been combined, have failed to address the system capacity problem noted above.

Thus, in combining dispatch and interconnect communications, a need exists for a system solution which provides large interconnect capacity through frequency reuse while suffering a minimum of capacity reduction relative to single big tower operation for dispatch.

SUMMARY OF THE INVENTION

The present invention is directed to a combined cellular interconnect and dispatch communication system in which loss of cellular interconnect capacity arising from dispatch communication operations is substantially reduced or minimized.

A cellular interconnect and dispatch system includes a plurality of base cellular interconnect stations, each having a cell or small radio communication tower and a cell station transceiver and control circuit. A dispatch station is located in an area serviced by the base interconnect stations and has a communication and control circuit for receiving and transmitting radio signals to and from the base interconnect stations. A dispatch tower station has a dispatch or large radio communication tower and a dispatch tower transceiver and control circuit. The transceiver and control circuit of each interconnect base station receives dispatch talk request signals from terminal units in its broadcast area and retransmits the talk request signals to the dispatch station. The dispatch station communication and control circuit generates and transmits channel assignment control signals to the base interconnect stations in response to the request signals therefrom. The interconnect transceiver and control circuit of each interconnect base station receives any channel control signal transmitted to it from the dispatch station communication and control circuit and retransmits such channel assignment control signal to terminal units in the broadcast area of such interconnect base station. One of the dispatch tower transceiver and control circuit and the group of cell tower transceiver and control circuits receives voice signals from terminal units in the communication area of the system. One of the dispatch tower transceiver and control circuit and the group of cell tower transceiver and control circuits generates voice signals for broadcast to terminal units in the system communication area.

It is to be understood that both the foregoing general description and the following detailed description are exemplary and explanatory and are intended to provide further explanation of the invention as claimed.

The accompanying drawings, which are incorporated in and constitute a part of this specification, illustrate a preferred embodiment of the invention and together with the description provide an explanation of the objects, advantages and principles of the invention.

BEST MODE OF THE INVENTION

The present invention provides a combined cellular interconnect and dispatch system in which large cellular interconnect capacity is provided through frequency reuse and in which big tower operation is provided for dispatch communications with relatively small or minimal reduction of cellular interconnect capacity.

Additionally, the multicell approach generally offers better radio coverage particularly for portable units having low transmit power. It is also desirable that such portable units work well in the dispatch environment. Generally, terminals in the system may be either fixed, such as those located at hospitals or other locations, or they may be portable such as those provided as mobile units in vehicles.

Figure 10:
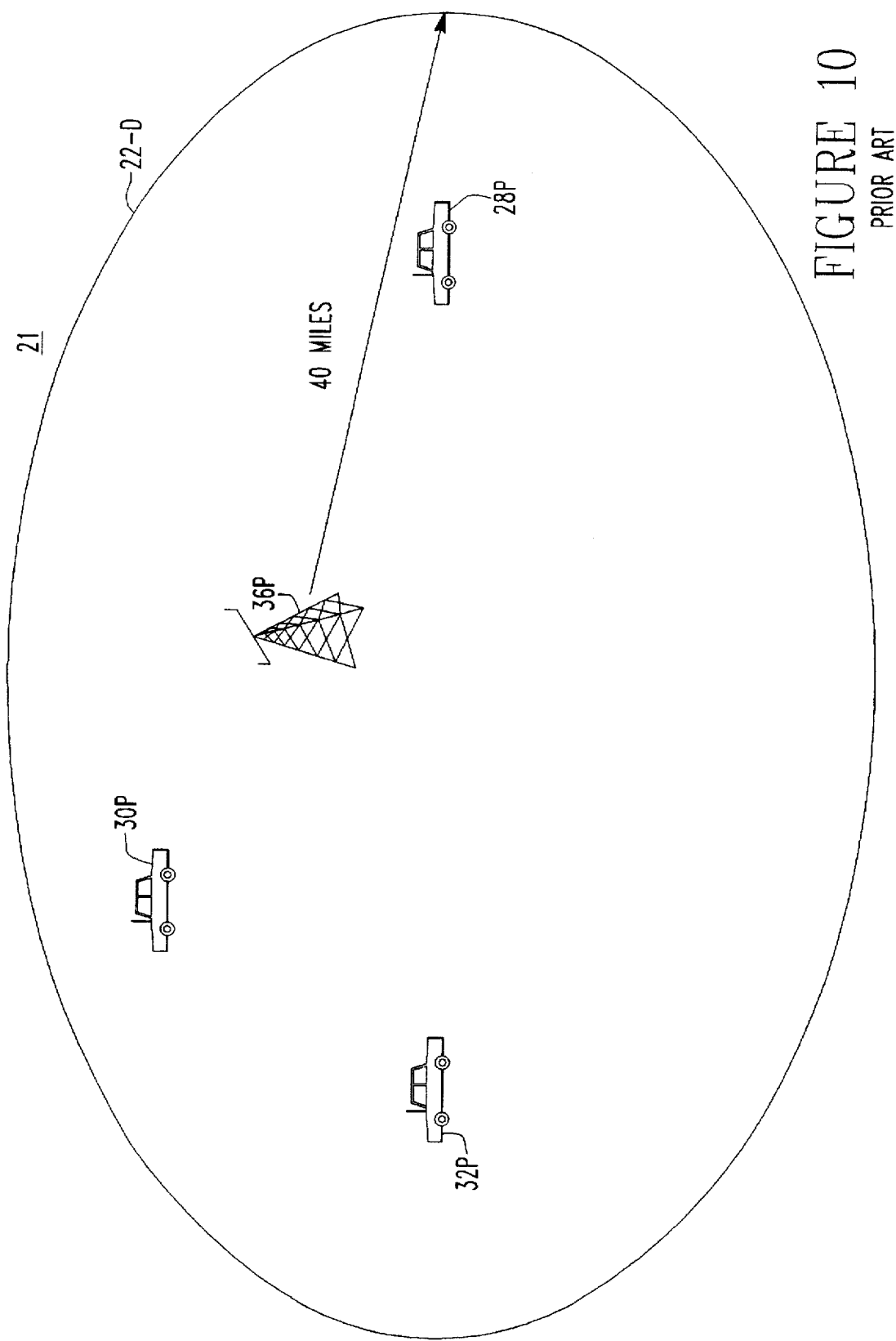
FIG. 10 is a schematic diagram of a prior art dispatch system.

A typical prior art dispatch system 21 is shown in FIG. 10 to illustrate basic architectural differences between systems of the invention and systems of the prior art. Thus, the prior art dispatch system 21 covers an area 22-D corresponding to area 22 of FIG. 1. However, all dispatch communications between terminal units, in this case, mobile units in vehicles 28P, 30P, and 32P, and a dispatcher are exclusively performed directly between the respective vehicles and a big tower 36P.

Figure 1:
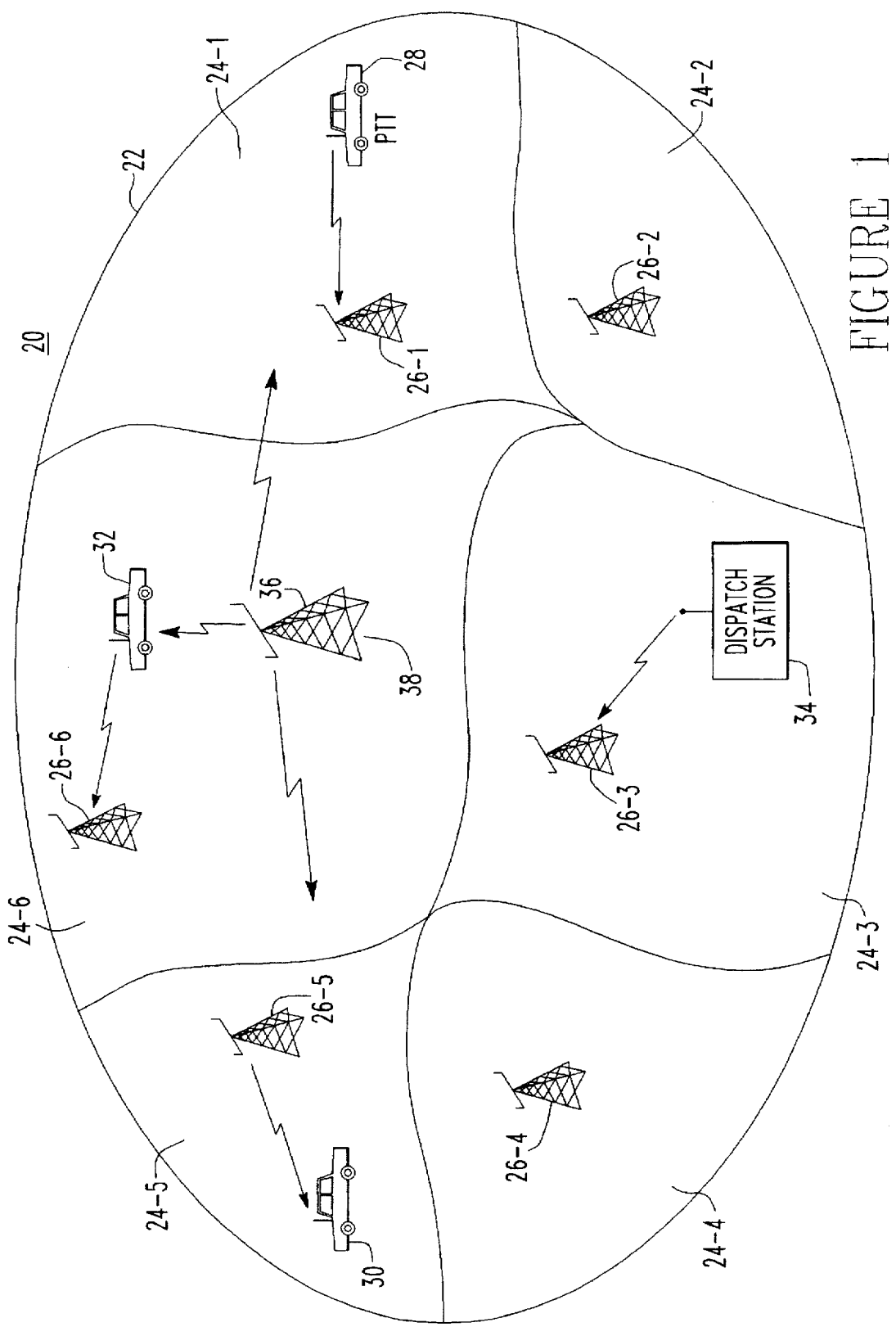
FIG. 1 shows a schematic diagram of a combined cellular interconnect and dispatch communication system arranged to provide communication service to a predetermined area in accordance with the invention.

A portion of a combined interconnect cellular and dispatch system (CID) 20 of a preferred embodiment of the invention is shown in FIG. 1 for the predetermined geographic area 22. Generally, the invention can be embodied with use of various kinds of dispatch systems or cellular-interconnect systems. For example, conventional analog or digital (SMR or DSMR) dispatch systems may be employed; and conventional analog or digital (AMPS or AMPS-D) cellular systems.

A cellular architecture generally suitable for this system 20 is disclosed in U.S. Pat. No. 5,365,571, Cellular System Having Frequency Plan and Cell Layout With Reduced Co-Channel Interference, Method and Apparatus for of Voice Inactivity to Increase the Capacity of a Timed Division Multiple Access Radio Communications System issued to P. S. Rha et al. on Nov. 15, 1994, and assigned to the present assignees. Six cells 24-1 through 24-6 are provided for interconnect communications in the portion of the system 20 shown. In turn, each cell is provided with a base station 26-1, 26-2, etc., each of which is sectored to provide frequency reuse. A cell or small tower, used as an icon for each base station, provides communications service for its associated cells.

A dispatch or big tower 36 is provided in the system 20 at a location 38 having high elevation, such as on the top of a hill. The dispatch tower 36 provides dispatch communications, over an area which spans multiple cells, in a manner more fully explained hereinafter.

FIG. 1 also shows representative terminal units, i.e., in this case mobile units having handsets in vehicles 28, 30, and 32. Each vehicle has a cellular transceiver for dispatch communications and, if desired, cellular interconnect communications. The vehicles 28–32 may be part of a fleet, such as a taxi fleet, for which dispatch communications are provided by the cellular interconnect/dispatch system (CID) 20.

A dispatch station 34 provides central dispatch communications with the vehicles 28–32. Dispatch communications may also be initiated in each vehicle for reception by the dispatch station 34 and all fleet vehicles.

Figure 2A:
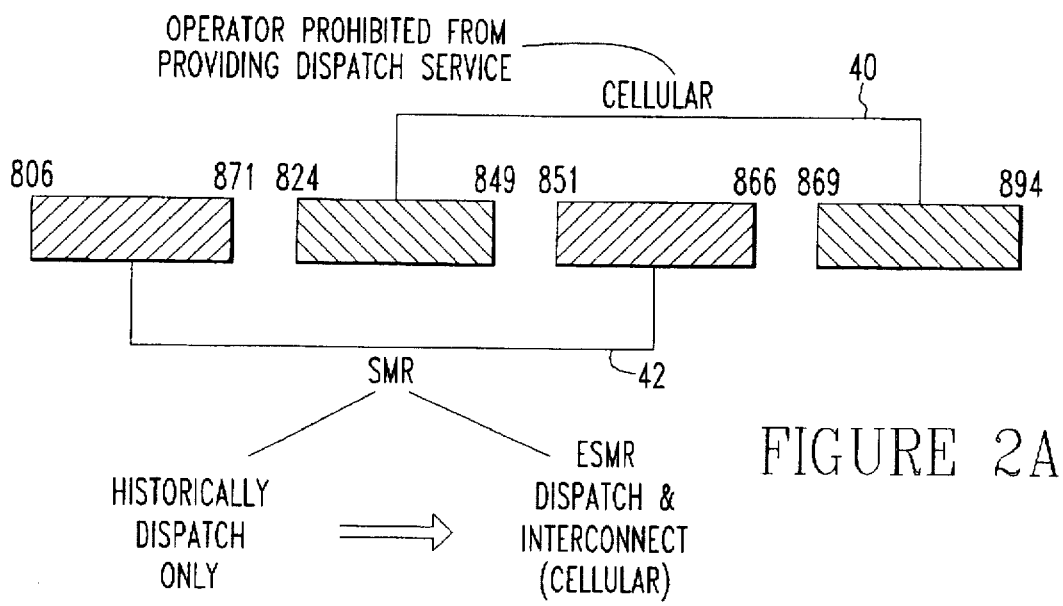
FIG. 2A is a graph illustrating FCC frequency assignments for cellular interconnect and dispatch communications.

As schematically illustrated in FIG. 2A, authorized frequency assignments allow combined dispatch and interconnect services. A previously authorized SMR dispatch band 42 extends from 806 Mhz to 821 MHz and from 851 MHz to 866 MHz. The new ESMR authorization permits combined dispatch and interconnect services to be provided in this portion of the spectrum.

As indicated previously, when interconnect and dispatch services are combined, one half of a duplex pair is needed in each of the cells for each dispatch conversation for a total of $N_{ch}$ channels. If subscribers are located in F cells, the interconnect capacity of the dispatch cellular system is reduced to $N_{ch}/F$. If the system has no information regarding the exact cells in which dispatch customers are located, the capacity is reduced by the total number of cells in the system to $N_{ch}/N_{cell}$. These possibilities for system interconnect capacity are shown in FIG. 2B where the number of channels per cellular cell is plotted along the ordinate and the number of cells contained in the combined dispatch and interconnect area is plotted along the abscissa.

When a dispatch system is operated in conjunction with an interconnect system, several design options exist. Each system cell or small tower can transmit the dispatch information so that a mobile station will be able to participate without regard to where it is located. The mobile station can be located using a registration technique and a radio channel can then be activated only in the cell in which the mobile station is located.

Alternatively, a dispatch or large tower can be used for dispatch and the small towers can be used for interconnect, and a mechanism can move operation from one to the other depending on the need of the particular subscriber at any given time. Finally, dispatch can be operated in the forward direction from a dispatch tower and dispatch can be operated in the reverse direction from the cell towers to improve radio coverage. Hereinafter, cell towers will be referred to as small towers, and dispatch towers will be referred to as big towers.

Figure 2B:
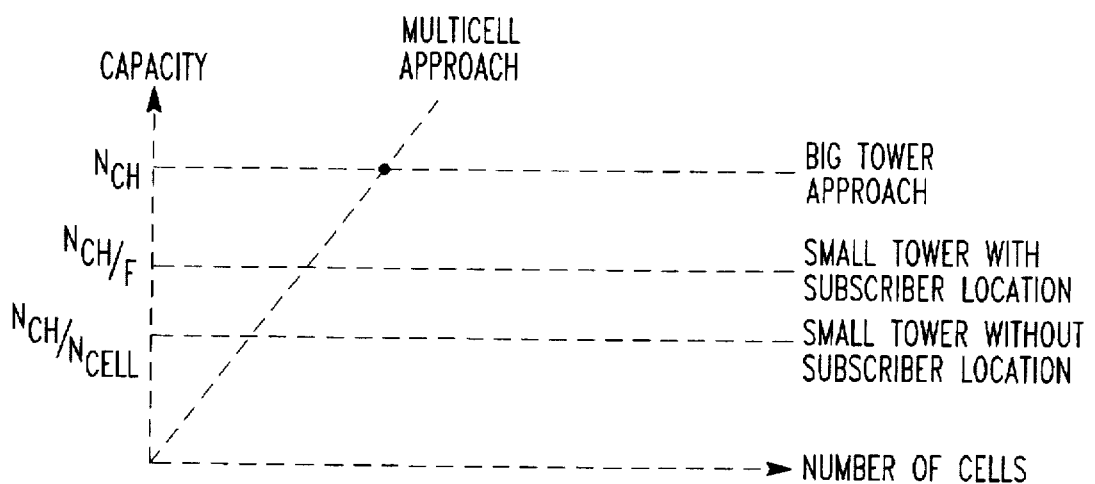
FIG. 2B compares the system interconnect capacity for different system configurations.

With reference to the capacity chart in FIG. 2B, the big tower approach is superior to the multicell or multi-small tower approach when the number of cells in the serving region is relatively small. For relatively large numbers of cells, the multicell approach is superior.

In accordance with the invention, three different operational configurations can be provided for dispatch while maintaining the interconnect subscriber functions in the cellular reuse configuration. These dispatch operational configurations are referred to as Big/Big, Big/Small, Small/Small. The invention provides a CID system which can be configured to provide a best or optimal solution for any subscriber and radio situation. Conventional technology can be used to set up or tear down cellular and dispatch calls in each of these configurations.

The Big/Big tower configuration generally operates as follows. Mobile units move throughout the service region listening to the control channel serving the cell in which they are currently located, i.e. their serving cell. A mobile unit initiates a dispatch conversation by using a push to talk button. This causes entry of a request into the system through the local control channel. Other mobile units participating in this dispatch conversation are given their listening channel assignment information on the control channels in their serving cells. Once the assignments have been distributed, the conversation can begin. The big tower transmits to the mobile units and receives from the mobile units over the radio channels used for the conversation.

Figure 3:
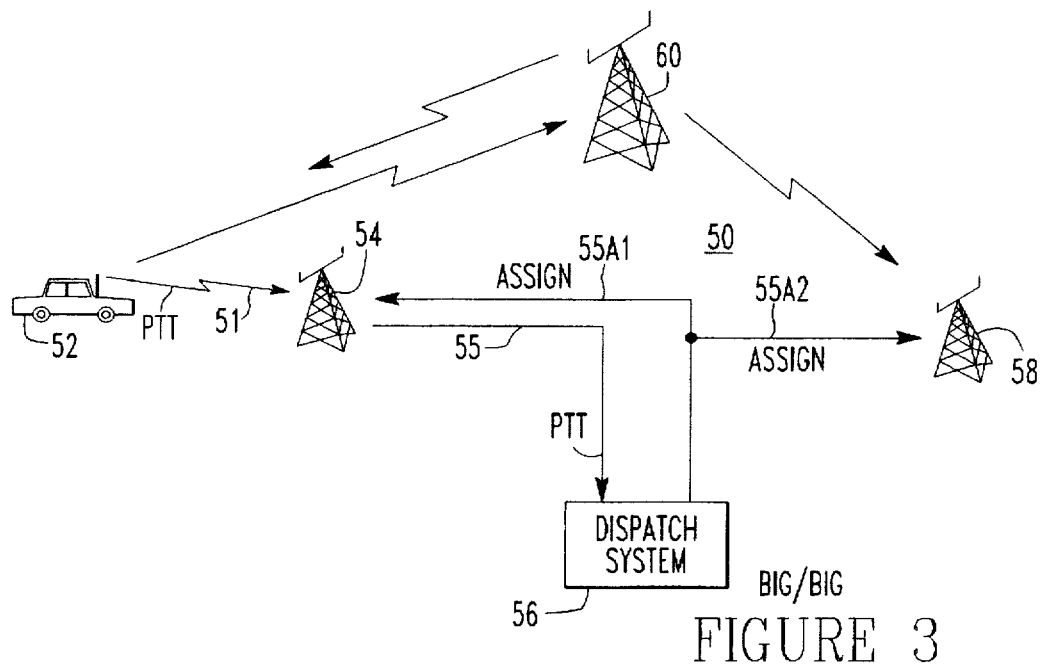
FIG. 3, 4, and 5 show schematic diagrams of respective system applications of the invention for communication areas having differing architectures.

In a Big/Big tower configuration 50 shown in FIG. 3, a push-to-talk (PTT) signal 51 is sent from a mobile unit 52 to a base station tower 54 from which it is routed over a connection 55 to a dispatch system 56. Frequency assignments are made by the system 56 and transmitted over connections 55A1 and 55A2 to the small tower 54 and one or more other small (base station) towers 58 for radio transmission to mobile units located in the cells. Voice communication then occurs at the assigned frequency directly through a big tower 60, i.e., from the mobile unit to the big tower 60 and from the big tower 60 to the mobile units.

In the Big/Big tower configuration, no small tower voice channels are used, thereby saving voice channels, although small tower control channels are used. Further, mobile units need not be located by the dispatcher, rather the dispatcher is self-located to the system. Listening frequency assignments are sent to all cells.

Figure 4:
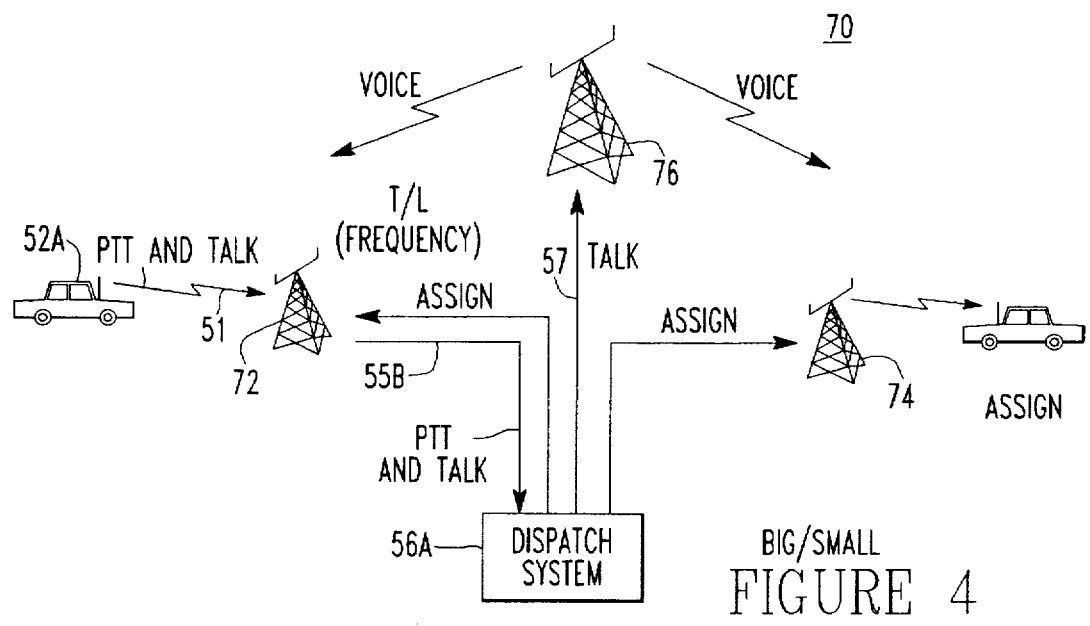

As shown in FIG. 4, a Big/Small tower configuration 70 employs voice transmission from mobile units through small towers 72 and 74 to a big tower 76. Voice is broadcast directly from the big tower 76 to the mobile units.

The Big/Small tower configuration operates like the Big/Big tower configuration operates, but the small towers of the serving cells receive voice transmissions from mobile unit 55B, and send corresponding voice signals to a dispatch system 56A over the connection 55B. In turn, the dispatch system 56A transmits voice signals to the big tower 76 over connection 57 for broadcast to the system. A great improvement is thus provided in radio coverage for the mobile units.

Figure 5:
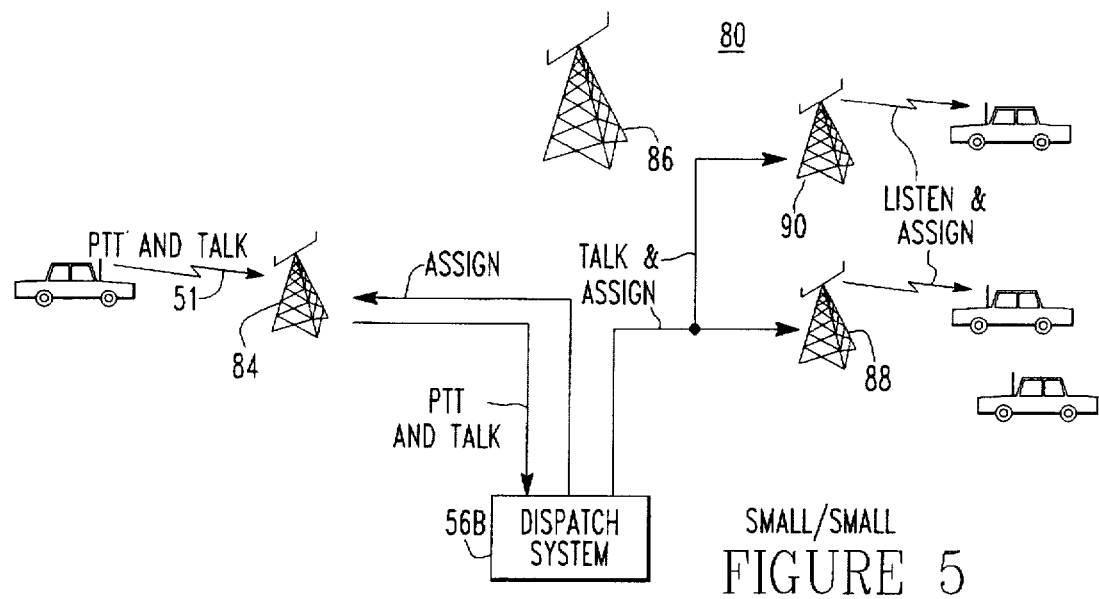

In a Small/Small tower configuration 80 shown in FIG. 5, a dispatch system 56B locates mobile units through a registration process. As dispatch-capable mobile units move between cells, they register with the dispatch system 56B so that the dispatch system 56B can record where they are located.

As with the other configurations, mobile stations in the Small/Small configuration interact through the control channel of the serving cell to set up dispatch conversations. In the Small/Small tower configuration, however, forward transmission to the mobile units is from small towers instead of big tower 86. The forward transmissions are received only by small towers 88 and 90 in cells which have a registered dispatch mobile unit which needs to participate in the particular conversation. In the Small/Small tower configuration, the big tower is not employed.

The following are preferably provided in implementing the invention to provide high-level performance:

1. Fast Acquiring Mobile units (Big/Big, Big/Small)
2. Voice path routing (Big-Small, Small/Small)
3. BSC-based VLR (Small/Small)
4. Multisite receive capability (Small/Small)

Fast acquiring mobile stations are preferably employed since the mobile units normally listen to the control channel in the serving cell and listen to voice from the big tower during a dispatch conversation. In the TDMA system, time and frequency synchronization with the big tower is thus preferably acquired very quickly.

Figure 11:
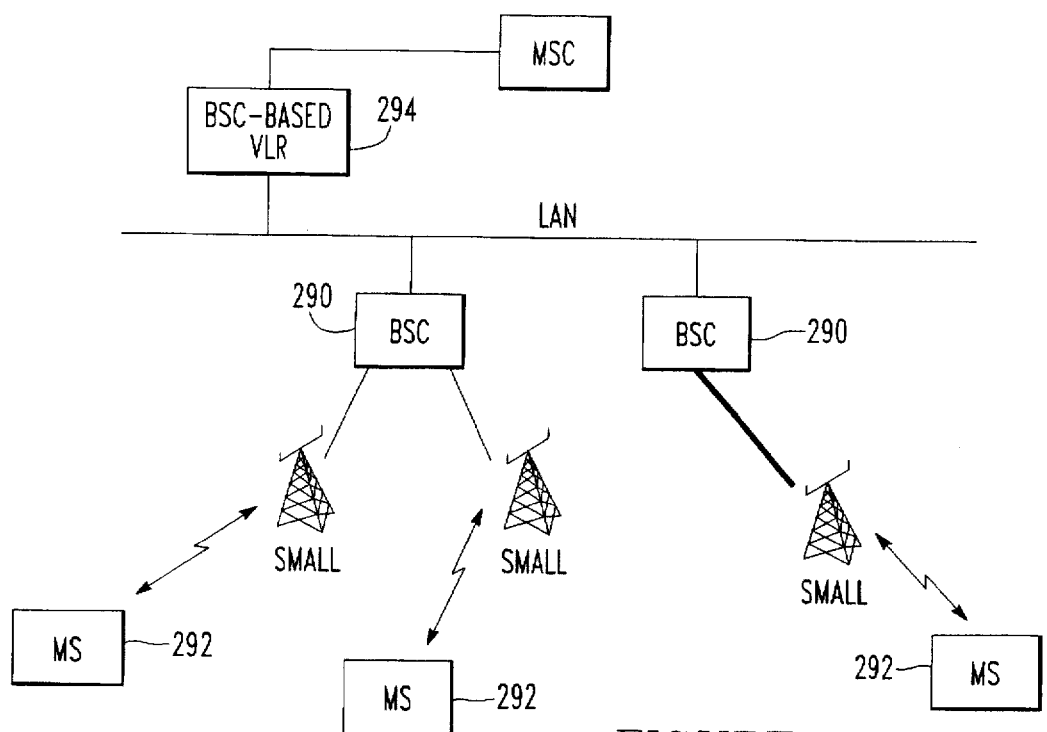
FIG. 11 illustrates voice routing in a Small/Small configuration of the invention.
Figure 12:
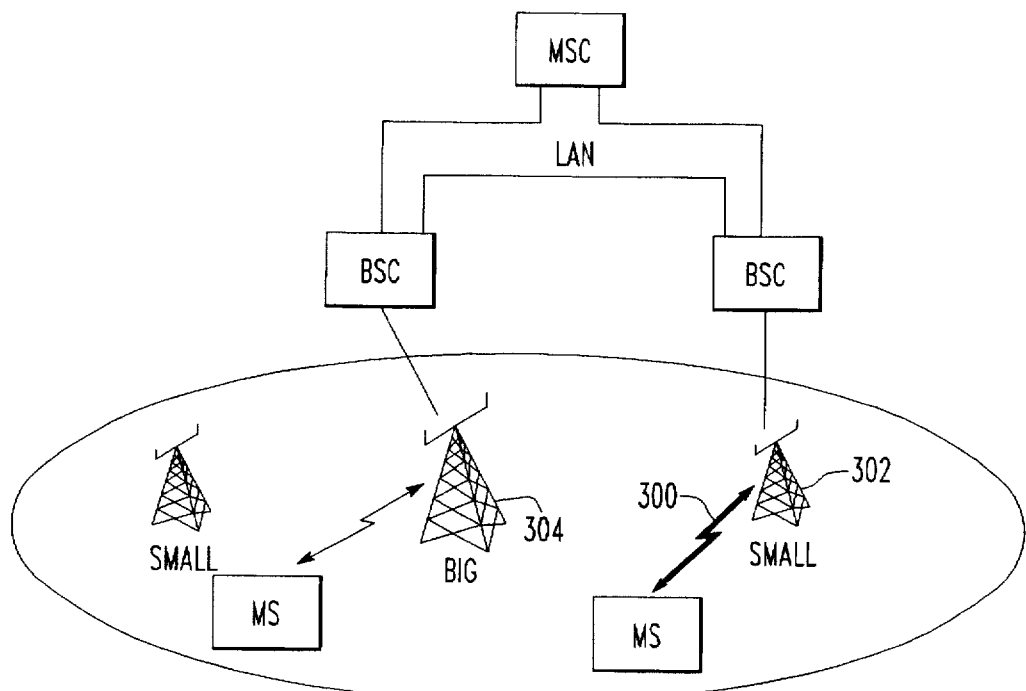
FIG. 12 illustrates voice routing in a Big/Small configuration of the invention.

As shown in FIG. 12, voice path routing is required in the Big/Small approach since a received voice 300 must be taken from a serving cell 302 and routed to a big tower 304. In the Small/Small approach, voice is routed (FIG. 11) from the serving cell, such as cell 290, to one or more other cells, such as cell 292, in which the dispatch conversation participants are located. Such routing is facilitated by knowledge of subscriber locations provided by a Visitor Location Register (VLR) in a base 294 for the cellular-interconnect/dispatch Base Station Controller (CID) system. Placement of the VLR within the BSC 290 (BSC-based VLR) facilitates rapid routing of voice to cells populated by mobile units 292 which need to receive that voice.

In implementing the invention, system communications control is provided by station control circuitry located at a station for the big tower, at the respective base stations, and at the dispatch system location. Such circuitry generally may be state-of-the-art circuitry operated as described herein to embody the invention.

Figure 6:
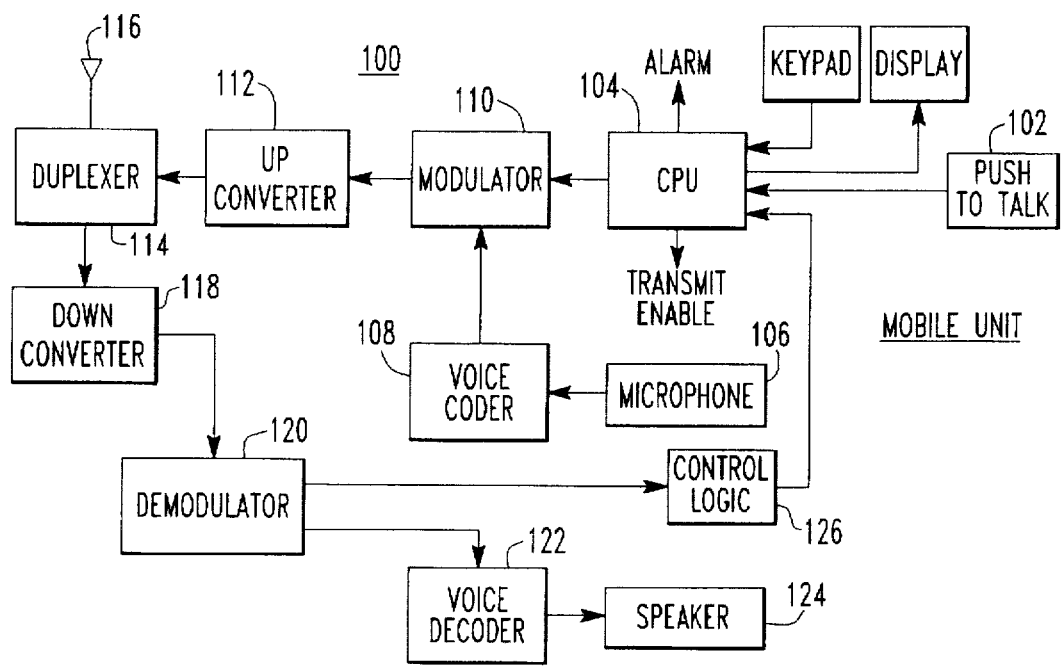
FIG. 6 shows a block diagram of terminal or mobile unit circuitry employed in the systems of FIGS. 3–5.

In FIG. 6, a mobile unit is provided in the form of a dispatch handset 100 for use in implementing the invention in any of the system configurations of FIGS. 3–5. As in the case of traditional dispatch handsets, a push-to-talk (PTT) button 102 is used to request a radio channel to carry speech. A digital processor (CPU) 104 detects a request, formats a request message, sends a signal embodying the message for transmission to the dispatch system, and waits for a reply.

If a reply is not received within a specified timeout, such as 500 nanoseconds, an alarm is generated to warn the user. If a timely reply is received from the dispatch system, i.e. a frequency assignment, the CPU 104 generates a transmit enable signal, and voice communications can be sent over the assigned radio channel.

As shown, a microphone 106 applies audio signals to a voice coder 108. A modulator 110 modulates voice signals from the voice coder 108 onto a carrier signal, and the modulator output is upconverted by unit 112 for application to a duplexer 114 and transmission through an antenna 116.

Incoming radio frequency signals are received by the antenna 116 and applied to a downconverter 118 through the duplexer 114. Downconverted signals are applied to a demodulator 120. Resultant voice signals are decoded by a decoder 122 which applies output audio signals to a speaker 124.

A radio frequency signal carrying a frequency assignment for a requested voice channel is received by the handset. After downconversion and demodulation of the received radio signal, an assignment signal is applied to control logic 126 which interprets the assignment and applies an output to the CPU 104 to implement the frequency assignment in the handset.

Figure 7:
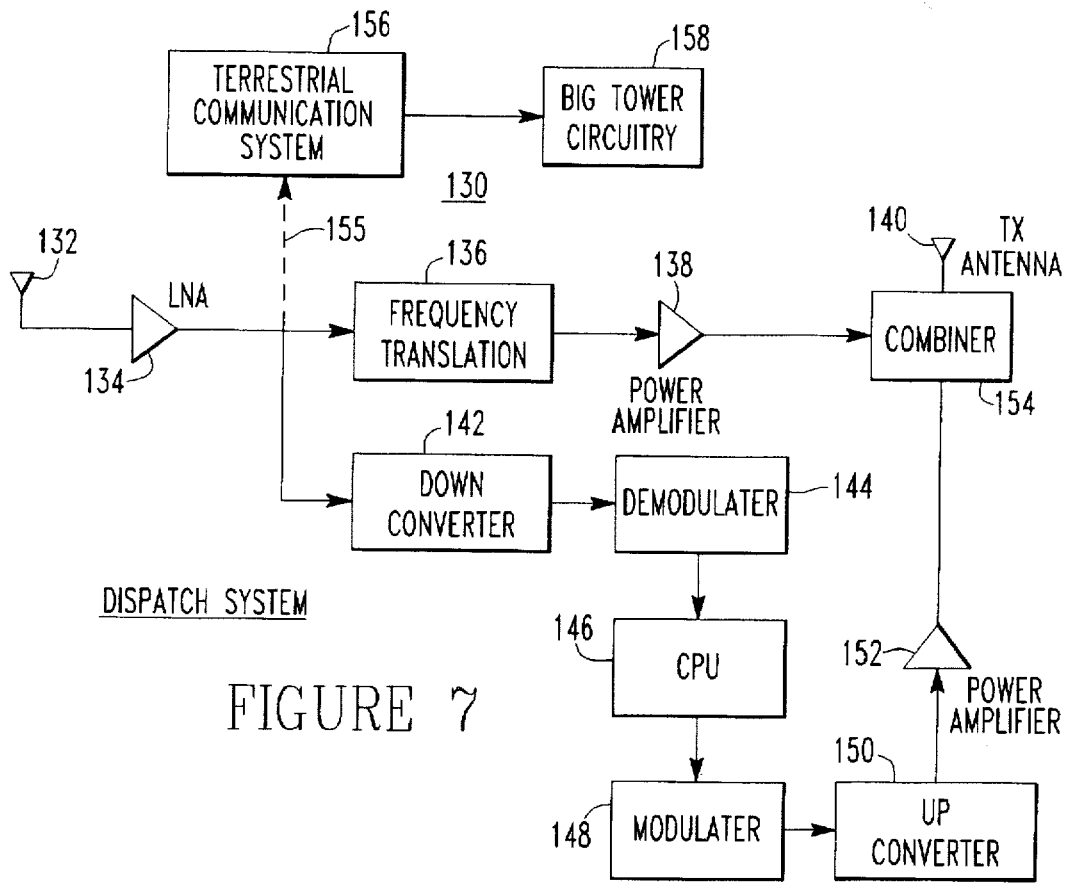
FIG. 7 is a block diagram of dispatch system circuitry employed in the systems of FIGS. 3–5.

A dispatch system 130 (FIG. 7) is employed in any of the system configurations of FIGS. 3–5 in accordance with the invention. Radio signals are received in the dispatch system 130 from Small Towers by a receiving antenna 132 and amplified by an LNA unit 134.

In the Small/Small configuration of FIG. 5, radio voice signals received from transmitting mobile units are applied to a unit 136 for translation to the transmit band, amplification by a power amplifier 138, and rebroadcast through a transmit antenna 140. Control signals received from transmitting mobile units are routed through a downconverter 142 to a demodulator 144.

The demodulated control signal is applied to a CPU 146 for processing. Thus, a channel assignment request is applied to and detected by the CPU 146, and a channel assignment is generated to honor the request. The channel assignment is output as a signal to a modulator 148 for upconversion and power amplification in units 150 and 152.

A radio frequency channel assignment signal is broadcast to mobile units through the transmit antenna 140. A combiner 154 is employed to enable both voice and control radio frequency signals to be applied to the transmit antenna 140.

In the Big/Small system configuration 70 of FIG. 4, the Big Tower is used to rebroadcast voice signals to mobile units in the system area. As indicated by dotted connector line 155, radio frequency voice signals received by the dispatch system 130, when it is operating in the configuration 70, are transmitted through a terrestrial communication system 156 to Big Tower circuitry 158 for rebroadcast by the Big Tower.

Figure 9A:
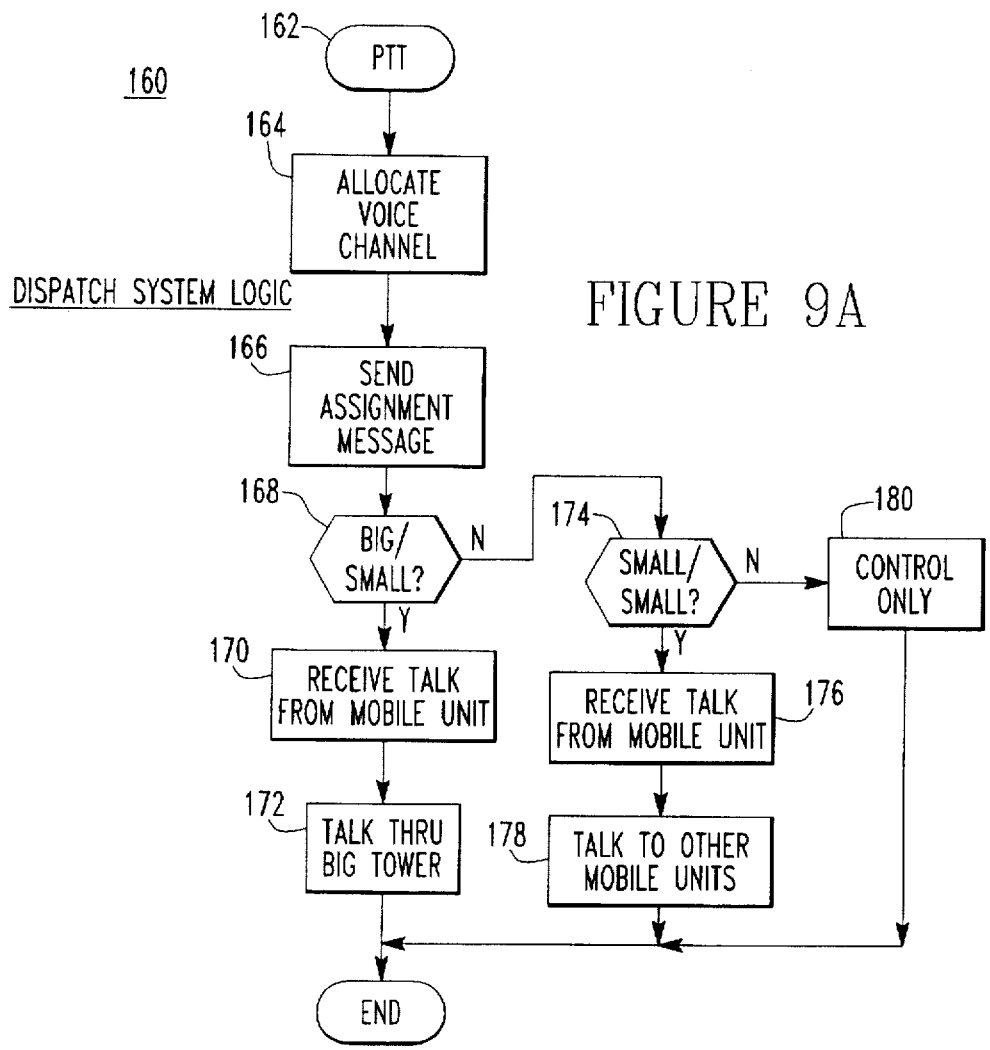
FIGS. 9A and 9B show respective logic diagrams for functions performed in dispatch system circuitry and dispatch tower circuitry.

The basic operation of the dispatch system 130 is illustrated by a logic flow diagram 160 in FIG. 9A. After a PTT signal is received in block 162, a voice channel is allocated in block 164 and an assignment message is sent to the mobile units.

Next, a Big/Small configuration test is made in block 168. If the dispatch system 130 is structured or selected to be in the Big/Small configuration 70 (FIG. 4), the system is set up in blocks 170 and 172 to receive and process talk from mobile units and to talk (i.e., rebroadcast) through the Big Tower.

If the dispatch system 130 is not set in the Big/Small configuration, a Small/Small configuration test is made in block 174. If the dispatch system 130 is set in the Small/Small configuration 80 (FIG. 5), the system is set up in blocks 176 and 178 to receive and talk directly to mobile units.

If the dispatch system 130 is not set in the Small/Small configuration 80, it is operating in the Big/Big configuration 50 (FIG. 3). Block 180 sets up the system for control-only operation, after which the logic process is ended.

Figure 9B:
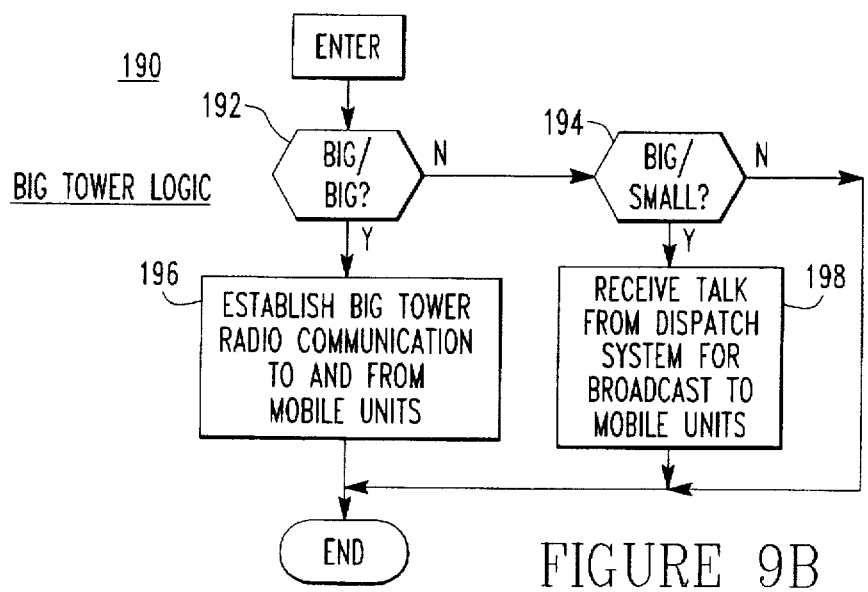

As previously indicated, state-of the-art Big tower circuitry is employed in implementing the invention. The Big tower circuitry employs configuration test logic as shown in a logic flow diagram 190 in FIG. 9B. Thus, Big/Big and Big/Small configuration tests are made in blocks 192 and 194.

If Big/Big is found, block 196 sets up Big tower radio communications directly to and from mobile sets. On the other hand, block 198 sets up the Big tower circuitry for broadcast only, with voice signals received from the dispatch system for broadcast to mobile units.

Figure 8:
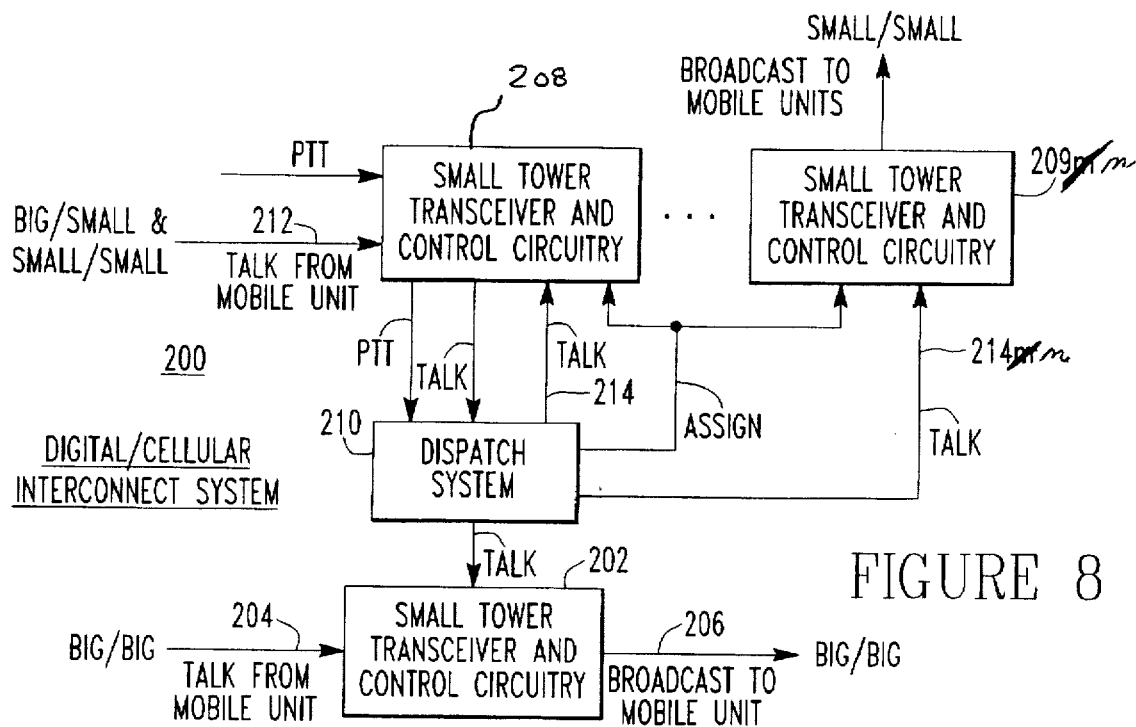
FIG. 8 is a block diagram showing cell or small tower, dispatch or big tower, dispatch unit, and terminal or mobile unit elements of the system with interrelationships enabling embodiment of any of the systems of FIGS. 3–5.

FIG. 8 shows a dispatch/cellular interconnect system 200 which is structured to enable implementation of any of the system configurations of FIGS. 3–5. When the system 200 is in the Big/ Big configuration, Big tower transceiver and control circuitry receives radio voice signals from mobile units, as indicated by reference character 204, and broadcasts radio voice signals to mobile units, as indicated by reference character 206. Small tower transceiver and control circuitry 208 operates only to receive PTT signals for radio transmission to dispatch system 210 for channel assignments as previously described.

When the system 200 is in the Big/Small configuration, the Small tower transceiver and control circuitry 208 receives radio voice and PTT signals from mobile units as indicated by reference character 212, and these signals are processed for radio transmission to the dispatch system 210. The voice signals are then processed by the dispatch system 210 and transmitted terrestrially to the Big tower transceiver and control circuitry 202 for broadcast.

In the Small/Small configuration, the dispatch system 210 receives radio voice signals from the Small tower transceiver and control circuitry 208 and transmits radio voice signals to Small tower transceiver and control circuitry 208 through 208n depending on the number of Small towers in the system, as indicated by reference characters 214 through 214n. The Big tower has no dispatch operation in this system configuration.

Generally, control messages such as access grants, are sent to terminal or mobile sets. The terminal or mobile units operate in both the dispatch and cellular interconnect systems. The mode of operation can be selected by the subscriber or a default mode can be provided for the system. For example, a terminal or mobile unit may default to dispatch operation until the subscriber selects interconnect mode operation through handset or other controls.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A cellular interconnect/dispatch system comprising:

a plurality of base cellular interconnect stations;

each of the base cellular interconnect stations having a cell radio communication tower and a cell tower transceiver and control circuit;

a dispatch station located in an area serviced by the base interconnect stations and having a communication and control circuit for receiving and transmitting radio signals to and from the base interconnect stations;

a dispatch tower station having a dispatch radio communication tower and a dispatch tower transceiver and control circuit;

the transceiver and control circuit of each base interconnect station receiving dispatch talk request signals from terminal units in its broadcast area and retransmitting the talk request signals to the dispatch station;

the dispatch station communication and control circuit generating and transmitting channel assignment control signals to the base interconnect stations in response to request signals therefrom;

the transceiver and control circuit of each interconnect base station receiving any channel control signal transmitted to it from the dispatch station communication and control circuit and retransmitting such channel assignment control signal to terminal units in the broadcast area of such interconnect base station;

one of the dispatch tower transceiver and control circuit and the group of cell tower transceiver and control circuits receiving voice signals from terminal units in the communication area of the system; and one of the dispatch tower transceiver and control circuit and the group of cell tower transceiver and control circuits generating voice signals for broadcast to terminal units in the system communication area.

2. The system of claim 1 wherein the cell tower transceiver and control circuits broadcast and receive voice signals to and from terminal units.

3. The system of claim 2 wherein broadcasts from cell tower transceiver and control circuits are limited to such circuits which have terminal units located in the broadcast areas corresponding thereto and identified by the channel assignment control signals for dispatch communication.

4. The system of claim 1 wherein the dispatch tower transceiver and control circuit broadcasts and receives voice signals to and from terminal units.

5. The system of claim 1 wherein the cell tower transceiver and control circuits broadcast and receive voice signals to and from terminal units.

6. The system of claim 4 wherein broadcasts from cell tower transceiver and control circuits are limited to such circuits which have the terminal units located in the broadcast areas corresponding thereto and identified by the channel assignment control signals for dispatch communication.

7. The system of claim 1 wherein at least two terminal units are located in the system communication area, each of the terminal units having a push-to-talk control and adapted to transmit and receive communication signals to the one receiving tower transceiver and control circuit and from the one transmitting tower transceiver and control circuit.

8. The system of claim 7 wherein the dispatch tower transceiver and control circuit is both the one receiving tower transceiver and control circuit and the one transmitting tower transceiver and control circuit.

9. The system of claim 7 wherein the cell tower transceiver and control circuits are both the one receiving tower transceiver and control circuits and the one transmitting tower transceiver and control circuits.

10. The system of claim 7 wherein the dispatch tower transceiver and control circuit is the one transmitting tower transceiver and control circuit and the cell tower transceiver and control circuits are the one receiving tower transceiver and control circuits.

11. A method for operating a cellular interconnect/dispatch system which has a plurality of base cellular interconnect stations, each having a cell radio communication tower and a cell tower transceiver and control circuit, a dispatch station located in an area serviced by the base interconnect stations and having a communication and control circuit for receiving and transmitting radio signals to and from the base interconnect stations, and a dispatch tower station having a dispatch radio communication tower and a dispatch tower transceiver and control circuit; the steps of the method comprising:

operating the transceiver and control circuit of each base interconnect station to receive dispatch talk request signals from terminal units in its broadcast area and retransmitting the talk request signals to the dispatch station;

operating the dispatch station communication and control circuit to generate and transmit channel assignment control signals to the base interconnect stations in response to request signals therefrom;

operating the transceiver and control circuit of each interconnect base station to receive any channel control signal transmitted to it from the dispatch station communication and control circuit and retransmitting such channel assignment control signal to terminal units in the broadcast area of such interconnect base station;

operating one of the dispatch tower transceiver and control circuit and the group of cell tower transceiver and control circuits to receive voice signals from terminal units in the communication area of the system; and operating one of the dispatch tower transceiver and control circuit and the group of cell tower transceiver and control circuits to generate voice signals for broadcast to terminal units in the system communication area.

12. The method of claim 11 wherein the cell tower transceiver and control circuits broadcast and receive voice signals to and from terminal units.

13. The method of claim 11 wherein the dispatch tower transceiver and control circuit broadcasts and receives voice signals to and from terminal units.

14. The method of claim 11 wherein the cell tower transceiver and control circuits broadcast and receive voice signals to and from terminal units.

* * * * *